US008838957B2

(12) United States Patent
Chou et al.

(10) Patent No.: US 8,838,957 B2
(45) Date of Patent: *Sep. 16, 2014

(54) STATELESS CRYPTOGRAPHIC PROTOCOL-BASED HARDWARE ACCELERATION

(71) Applicant: Aruba Networks, Inc., Sunnyvale, CA (US)

(72) Inventors: Randy Chou, San Jose, CA (US); Brijesh Nambiar, Sunnyvale, CA (US)

(73) Assignee: Aruba Networks, Inc., Sunnyvale, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/781,490

(22) Filed: Feb. 28, 2013

(65) Prior Publication Data
US 2013/0179678 A1 Jul. 11, 2013

Related U.S. Application Data

(63) Continuation of application No. 13/069,221, filed on Mar. 22, 2011, now Pat. No. 8,392,968, which is a continuation of application No. 11/496,659, filed on Jul. 31, 2006, now Pat. No. 7,966,646.

(51) Int. Cl.
*H04L 29/06* (2006.01)
*H04W 52/28* (2009.01)
*H04L 9/32* (2006.01)
*H04L 9/08* (2006.01)

(52) U.S. Cl.
CPC ........... *H04W 52/281* (2013.01); *H04L 9/3271* (2013.01); *H04L 9/0844* (2013.01); *H04L 2209/122* (2013.01); *H04L 63/04* (2013.01); *H04L 63/08* (2013.01); *H04L 63/061* (2013.01); *H04L 2209/80* (2013.01); *H04L 63/166* (2013.01)
USPC ........................................................ 713/151

(58) Field of Classification Search
None
See application file for complete search history.

(56) References Cited

U.S. PATENT DOCUMENTS

| 6,094,485 | A  | 7/2000  | Weinstein et al. |
| 6,539,093 | B1 | 3/2003  | Asad et al. |
| 6,748,528 | B1 | 6/2004  | Greenfield |
| 6,785,719 | B1 | 8/2004  | Jacobson et al. |
| 7,100,054 | B2 | 8/2006  | Wenisch et al. |
| 7,114,080 | B2 | 9/2006  | Rahman et al. |
| 7,334,125 | B1 | 2/2008  | Pellacuru |
| 7,412,524 | B1 | 8/2008  | Gupta et al. |
| 7,467,099 | B2 | 12/2008 | Kamada et al. |
| 7,519,810 | B2 | 4/2009  | Blew et al. |

(Continued)

OTHER PUBLICATIONS

U.S. Appl. No. 11/496,659, Non-Final Office Action, mailed Dec. 23, 2009.

(Continued)

*Primary Examiner* — Brandon Hoffman
(74) *Attorney, Agent, or Firm* — Varun A. Shah

(57) ABSTRACT

According to one embodiment of the invention, a method comprises an operation of commencing a first phrase and passing control of an authentication handshaking protocol. The first phase is commenced for establishing a secure communication path by a data path processor within a first network device. The first phrase comprises an exchange of data during an authentication handshaking protocol. The passing of control for authentication handshaking protocol by the data path processor to a control path processor is conducted to complete the authentication handshaking protocol.

21 Claims, 4 Drawing Sheets

(56) References Cited

U.S. PATENT DOCUMENTS

| | | | |
|---|---|---|---|
| 7,797,276 | B1 | 9/2010 | Yang |
| 7,873,827 | B2 | 1/2011 | Miyazawa |
| 7,966,646 | B2 | 6/2011 | Chou et al. |
| 2002/0087884 | A1 | 7/2002 | Shacham et al. |
| 2002/0144128 | A1 | 10/2002 | Rahman et al. |
| 2002/0166048 | A1 | 11/2002 | Coulier |
| 2003/0014623 | A1* | 1/2003 | Freed et al. .................. 713/150 |
| 2003/0016819 | A1 | 1/2003 | Cheng |
| 2003/0033545 | A1 | 2/2003 | Wenisch et al. |
| 2003/0177358 | A1 | 9/2003 | Martin et al. |
| 2003/0221126 | A1 | 11/2003 | Berman et al. |
| 2004/0015406 | A1 | 1/2004 | Kamada et al. |
| 2004/0093419 | A1 | 5/2004 | Weihl et al. |
| 2004/0181668 | A1 | 9/2004 | Blew et al. |
| 2004/0218762 | A1 | 11/2004 | Le Saint et al. |
| 2004/0268152 | A1 | 12/2004 | Xia et al. |
| 2006/0047950 | A1 | 3/2006 | Thayer |
| 2006/0047965 | A1 | 3/2006 | Thayer |
| 2006/0230446 | A1 | 10/2006 | Vu |
| 2007/0005981 | A1 | 1/2007 | Miyazawa |
| 2007/0074282 | A1 | 3/2007 | Black et al. |
| 2007/0198823 | A1 | 8/2007 | Blew et al. |
| 2007/0291936 | A1 | 12/2007 | Milana et al. |
| 2008/0089521 | A1 | 4/2008 | Le Saint et al. |
| 2008/0130900 | A1 | 6/2008 | Hsieh |
| 2008/0137855 | A1 | 6/2008 | Enomoto et al. |
| 2008/0209209 | A1 | 8/2008 | Gupta et al. |
| 2011/0113244 | A1 | 5/2011 | Chou et al. |
| 2011/0173439 | A1 | 7/2011 | Chou et al. |

OTHER PUBLICATIONS

U.S. Appl. No. 11/496,659, Final Office Action, mailed Jun. 15, 2010.

U.S. Appl. No. 11/496,659, Notice of Allowance, mailed Feb. 4, 2011.

U.S. Appl. No. 13/069,221, Non Final Office Action, mailed May 30, 2012.

U.S. Appl. No. 13/069,221, Notice of Allowance, mailed Oct. 19, 2012.

U.S. Appl. No. 13/781,490, Non Final Office Action, mailed Oct. 24, 2013.

* cited by examiner

STATELESS CRYPTOGRAPHIC PROTOCOL-BASED HARDWARE ACCELERATION

CROSS-REFERENCE TO RELATED APPLICATIONS

This application is a continuation of U.S. patent application Ser. No. 13/069,221, now U.S. Pat. No. 8,392,968, and is based upon and claims the benefit of priority from U.S. patent application Ser. No. 11/496,659 filed Jul. 31, 2006, now U.S. Pat. No. 7,966,646, the entire contents of which are incorporated herein by reference.

FIELD

Embodiments of the invention relate to the field of communication security, and in particular, to a system, apparatus and method for providing hardware acceleration for use by cryptographic protocols in a multi-processor or multi-core processor environment.

GENERAL BACKGROUND

Over the last decade or so, many companies have installed communication networks in order to allow their employees access to various network resources. To improve efficiency and to support mobility, many wireless access enhancements have been added to local, personal, and wide area networks. Based on these enhancements, Wireless Local Area Networks (WLANs), Personal Area Networks (PANs) and Wide Area Networks (WLANs) have been and continue to be utilized by more and more users.

Typically, a WLAN supports communications between a number of wireless devices without any required line of sight for such communications. In current network configurations, multiple Access Points (APs) are coupled to a wired network, such as an Ethernet network for example, and each AP operates as a relay station by supporting communications between resources of the wired network and wireless stations (STAs). STAs are mobile, wireless devices that enable users to alter their physical locations, but still communicate over the network.

A networking switch is deployed as a central device within the WLAN. The networking switch is adapted to receive signals from devices communicatively coupled to the wired network or radio waves from wireless devices. For both types of communications, the networking switch directs traffic across the WLAN, enabling devices to communicate with each other.

Secure Socket Layer (SSL) and Transport Layer Security (TLS), the successor to SSL, are cryptographic protocols that may be used by networking switches to secure data communications over a wireless network. While there are slight differences between these cryptographic protocols, the overall functionality of these protocols is generally the same.

SSL and/or TLS (hereinafter referred to as "SSL/TLS") provides endpoint authentication and privacy over a network using cryptography. In typical use, a server is authenticated (e.g., the server identity is verified) while the client remains non-authenticated. However, SSL/TLS supports mutual authentication in accordance with a SSL or TLS Handshake Protocol that allows the server and client to authenticate each other and to negotiate a cryptographic algorithm and keys before information is exchanged. This enables the server and client to obfuscate their communications and prevent tampering by interlopers.

SSL/TLS operates on layers beneath application protocols (e.g., Hypertext Transfer Protocol "HTTP", Simple Mail Transfer Protocol "SMTP", etc.) but above the transport protocols such as Transport Control Protocol (TCP) and User Datagram Protocol (UDP). While SSL/TLS can add security to any protocol that uses reliable connections (such as TCP), it is most commonly used with HTTP to form a secure communication path "HTTPS" that many of us use to access secure web pages.

Currently, networking switches are implemented with two processors, where one processor handles the control path (CP processor) and the other processor handles the data path (DP processor). While the processing performance of the DP processor is far superior to the CP processor, and thus regularly handles encryption/decryption, it is normally difficult to program since these processors usually are implemented with a small, proprietary operating system (OS). The CP processor normally runs on a well-known OS and sacrifices speed for flexibility and configurability.

As a result, with networking switches, the CP processor handles the data processing except for offloading computationally intensive parts of the SSL/TLS operations such as performance of certain cryptographic functions such as RSA. This offloading solution has posed a number of disadvantages. For instance, state information needs to be maintained in the control path. This creates an unnecessary amount of data before an RSA handshake is even completed. Second, CP processors are highly susceptible to denial of service (DOS) attacks.

Alternatively, it has been suggested for the DP processor to handle the entire SSL/TLS operations within the data path. However, this solution causes increased design complexity when implementing features because it is typically much more difficult to implement features on the DP processor as mentioned above.

Hence, it would be advantageous to develop a communication scheme that enables any wireless device to communicate with another wireless device, and to make use of the acknowledgement signaling requirements described above.

BRIEF DESCRIPTION OF THE DRAWINGS

The invention may best be understood by referring to the following description and accompanying drawings that are used to illustrate embodiments of the invention.

DETAILED DESCRIPTION

Figure 1:
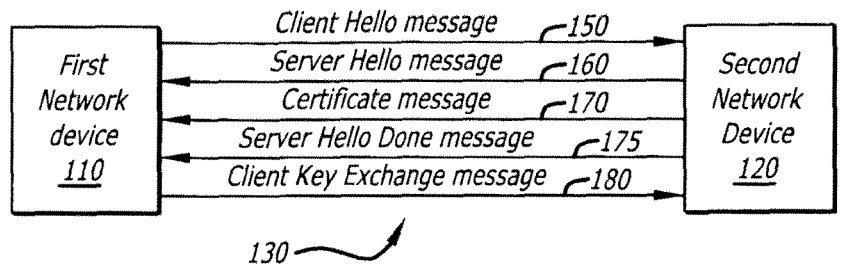
FIG. 1 is an exemplary embodiment of a SSL/TLS communication scheme in accordance with an embodiment of the invention performed by wireless devices of a wireless network.

Embodiments of the invention relate to the field of security, and in particular, to a network, networking switch and method for providing hardware acceleration for use by cryptographic protocols in a multi-processor or multi-core processor environment. This is accomplished by segmenting operations performed when conducting an authentication protocol, such as an SSL/TLS Handshake protocol (described below) or any other of the protocols that use SSL/TLS as a basis such as IEEE 802.1x. For instance, the authentication protocol may be implemented as an SSL Handshake Protocol and/or TLS Handshake Protocol (hereinafter referred to as the "SSL/TLS Handshake"), where one processing element performing the SSL/TLS Handshake from the start of a session until receipt of a Client Key Exchange message. Thereafter, another processing element completes the SSL/TLS Handshake.

More specifically, according to one embodiment of the invention, a first processing element of a network device handles the SSL/TLS Handshake until after receipt of the Client Key Exchange message. Once the first processing element receives the Client Key Exchange message, information to complete authentication operations for the SSL/TLS Handshake is transmitted to a second processing element.

More specifically, according to one embodiment of the invention, the first processing element sends a Pre-Master key to a second processing element as well as one or more hash values for messages that have transpired during the SSL/TLS Handshake. The hash value(s) is(are) required for the second processing element to continue the remaining part of the TLS handshake for example. The completion of a TLS handshake includes a hash of all the frames sent and received by each peer. The Pre-Master key and random numbers previously exchanged between the network devices are then used to produce a Master Key that is used to continue symmetric cryptographic operations.

Alternatively, in lieu of sending the Pre-Master key, it is contemplated that the Master Key may be generated by the first processing element and passed to the second processing element in a secure or non-secured manner.

Herein, the first processing element may be a data path (DP) processor and the second processing element may be a control path (CP) processor that is responsible for controlling the control plane, and thus, differs from the DP processor. Alternatively, the first and second processing elements may be separate processor cores of a multi-core processor.

Certain details are set forth below in order to provide a thorough understanding of various embodiments of the invention, albeit the invention may be practiced through many embodiments other that those illustrated. Well-known logic and operations are not set forth in detail in order to avoid unnecessarily obscuring this description.

Herein, a "network device" may be broadly construed as any device that supports secured communications with another device. Some of these network devices are wireless devices since they posses wireless functionality that support secured communications over a wireless link. Specific examples of a network device (some of which operating as wireless devices) include, but are not limited or restricted to a networking switch, server, portable or desktop computer, VoIP phone, personal digital assistant "PDA", and the like. Each network device comprises a plurality of processing elements. Examples of a "processing element" include, but are not limited or restricted to a processor, a processor core, or the like.

A "wireless link" may be broadly construed as a pathway that supports wireless communications between two wireless devices. The wireless communications are in accordance with a wireless communication standard such as High Performance Radio LAN (HiperLan) or IEEE 802.11. Examples of different types of IEEE 802.11 standards include, but are not limited or restricted to (i) an IEEE 802.11b standard entitled "Wireless LAN Medium Access Control (MAC) and Physical Layer (PHY) specifications: Higher-Speed Physical Layer Extension in the 2.4 GHz Band" (IEEE 802.11b, 1999), (ii) an IEEE 802.11a standard entitled "Wireless LAN Medium Access Control (MAC) and Physical Layer (PHY) specifications: High-Speed Physical Layer in the 5 GHz Band" (IEEE 802.11a, 1999), (iii) a revised IEEE 802.11 standard "Wireless LAN Medium Access Control (MAC) and Physical Layer (PHY) specifications" (IEEE 802.11, 2003), or the like.

The "Handshake Protocol" is a series of messages that negotiate the security parameters of a data transfer session. Normally, the Handshake Protocol between two network devices is generally performed by hardware under software control. The software is in the form of an application, an applet, a routine or even one or more executable instructions stored in a device storage medium. The "device storage medium" may include, but is not limited or restricted to a programmable electronic circuit, a semiconductor memory device, a volatile memory (e.g., random access memory, etc.), a non-volatile memory (e.g., read-only memory, flash memory, a hard drive, etc.), a portable memory device (e.g., floppy diskette, a compact disk "CD", digital versatile disc "DVD", a digital tape, a Universal Serial Bus, "USB" flash drive), or the like.

A "message" is information arranged in a selected format that is transmitted over a link. Examples of different messages include, but are not limited or restricted to data frames, "Hello" messages, Key Exchange messages, digital certificates and the like.

Referring to FIG. 1, an exemplary embodiment of a network 100 is shown. In accordance with one embodiment of the invention, network 100 comprises a first network device 110 and a second network device 120 in communication with each other. For instance, according to one embodiment of the invention, second network device 120 may be a networking switch that is directly connected to first network device 110 through a wireless link 130 so that security parameters can be negotiated by these devices during a SSL/TLS Handshake. According to another embodiment of the invention, second network device 120 is connected to first network device 110 through a wired link.

As generally shown, the SSL/TLS Handshake involves two primary phases. A first phase is referred to as the "Outer Authentication" phase in which the primary exchange of data during the SSL/TLS Handshake is performed in order to have sufficient information to compute the Master Key. The next phase is referred to the "Inner Authentication" phase where control of the SSL/TLS Handshake is passed from a first processing element to a second processing element. Hence, the second processing element now is responsible for completing the SSL/TLS Handshake with previously being required to store state and other information exchanged during the Outer Authentication phase. According to one embodiment of the invention, the Inner Authentication phase occurs after the Client Key Exchange message has been received from first network device 110.

With respect to the first phase, the SSL/TLS Handshake session begins with a transmission of a Client Hello message 150. Client Hello message 150 is a message that provides second network device 120 with information that is used to establish secured communications between network devices 110 and 120.

Figure 2A:
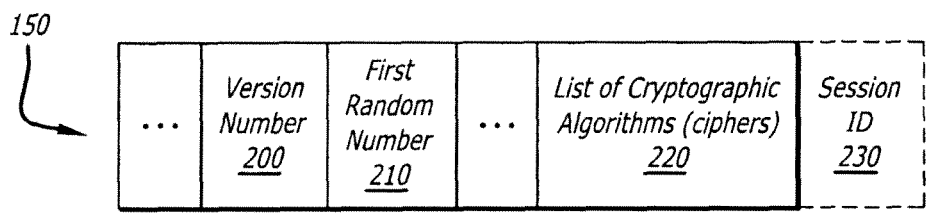
FIG. 2A is an exemplary embodiment of a Client Hello message sent from a first wireless device in accordance with the SSL/TLS scheme of FIG. 1.

For instance, as one embodiment of the invention and as shown in FIG. 2A, Client Hello message 150 comprises (i) a version number 200, (ii) a first random number 210, and (iii) a list 220 of cryptographic algorithms supported by first network device 110. Version number 200 is configured to identify the highest version of the SSL/TLS Handshake algorithm that is supported by first network device 110. First random number 210 is a pseudo-random number that may include date and time information. List of cryptographic algorithms 220 includes a list of ciphers supported by first network device 110 such as an RSA cipher, Ephemeral Diffie-Hellman (DHE) cipher, Data Signature Standard (DSS) cipher, or the like. Optionally, Client Hello message 150 may comprise a session identification (ID) 230 that is used to identify active or sessions that can be resumed.

Figure 2B:
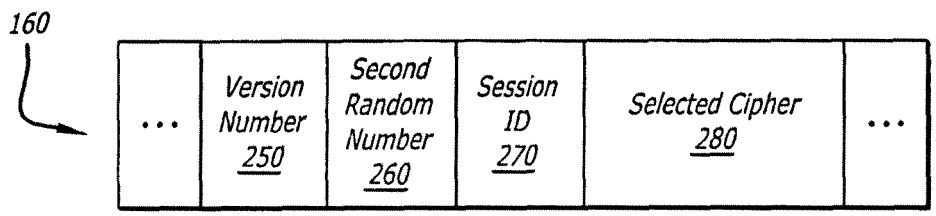
FIG. 2B is an exemplary embodiment of a Server Hello message sent from a second wireless device in accordance with the SSL/TLS scheme of FIG. 1.

In response to receiving and processing Client Hello message 150, a first processing element (not shown) of second wireless device 120 returns a Server Hello message 160 as shown in detail in FIG. 2B. Similar to Client Hello message 150, Server Hello message 160 comprises (i) a version number 250 that identifies the highest version of SSL/TLS supported by both devices. Additionally, Server Hello message 160 comprises (ii) a second random number 260, (iii) a session ID 270, and (iv) a selection of the cipher used by these devices 110 and 120 in their secured communications 280.

Additionally, second network device 120 sends a certificate message 170 to first network device 110. Certificate message 170 includes at least a digital certificate in a format that abides with cryptographic algorithms identified in Client Hello message 150 and includes a public key of second network device 120. It is contemplated that certificate message 170 may further include one or more additional certificates for validating the digital certificate, such as a digital certificate from a trusted third party (e.g., certification authority such as Verisign®, financial institution, trusted vendor, governmental entity, etc.). The digital certificate enables the secure transfer of the public key of second network device 120 to first network device 110.

Thereafter, second network device 120 sends a Server Hello Done message 175 to denote that it has finished and is awaiting a response from first network device 110. Server Hello Done message 175 does not include data, but rather, merely signals that transmissions in response to Client Hello message 150 have finished.

Figure 2C:
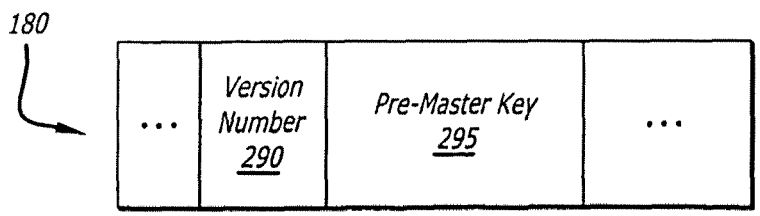
FIG. 2C is an exemplary embodiment of a Client Key Exchange message sent from the first wireless device in accordance with the SSL/TLS scheme of FIG. 1.

After receipt of Server Hello message 160, a client key exchange follows in accordance with the previously agreed upon cipher algorithm. For instance, in accordance with the RSA algorithm, first network device 110 generates a Client Key Exchange message 180 as shown in FIG. 2C. Client Key Exchange message 180 comprises (i) version number 290 previously included in Client Hello message 150 in order to prevent rollback attacks, and (ii) a Pre-Master key 295.

According to one embodiment of the invention, Pre-Master key 295 includes a 48-byte value that is generated by first network device 110. Pre-Master key 295 may be a random, pseudorandom or predetermined value. Prior to transmission, Client Key Exchange message 180 is encrypted, or alternatively Pre-Master key 295 is encrypted with the public key of second network device 120 that was recovered from digital certificate 170.

Upon receipt of Client Key Exchange message 180, second network device 120 can recover Pre-Master key 295 using its private key securely stored within second network device 120. Based on specific arithmetic and/or logical operations performed on the Pre-Master key 295, first random number 210 and second random number 260, a Master key can be produced prior to completion of the SSL/TLS authentication procedure. The Master key is now used as a symmetric key for supporting encrypted communications between the network devices 110 and 120.

Figure 3:
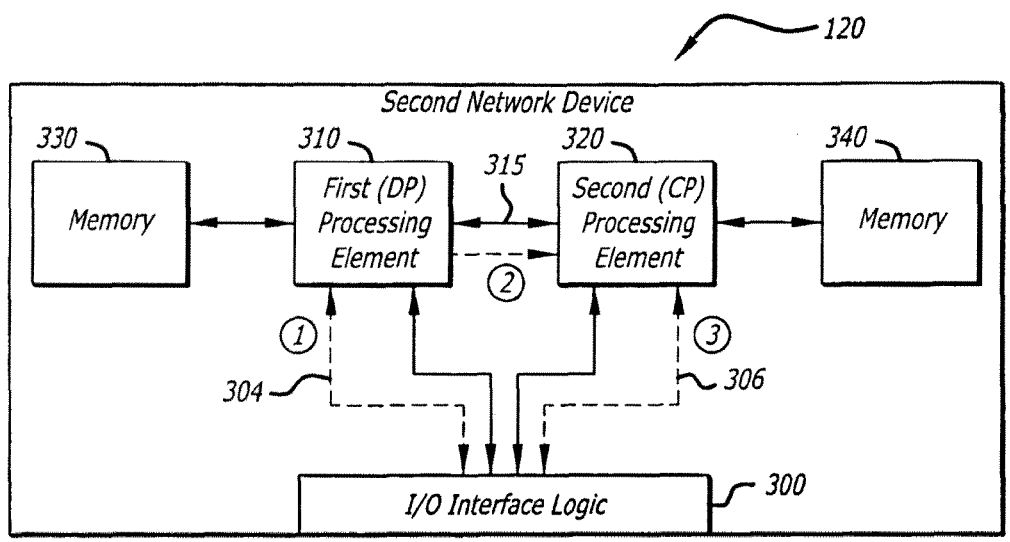
FIG. 3 is a first exemplary embodiment of a second wireless device operating in accordance with an embodiment of the invention.
Figure 4:
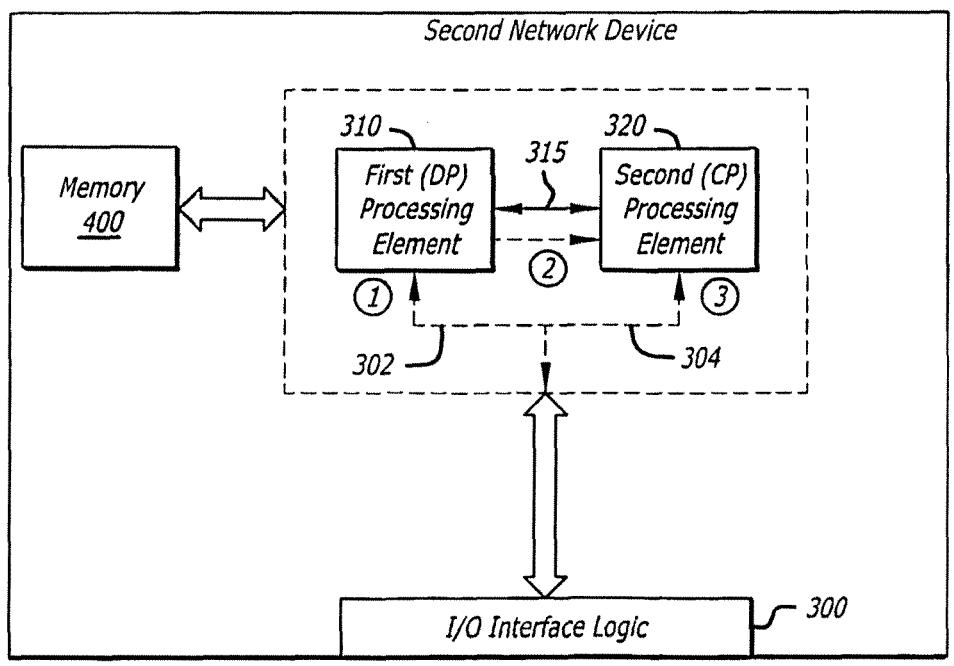
FIG. 4 is a second exemplary embodiment of a second wireless device operating in accordance with an embodiment of the invention.

Thereafter, the first processing element transfers control of the SSL/TLS Handshake to the second processing element as described further in FIGS. 3 and 4. Thereafter, second processing element performs the Inner Authentication phase and completes the SSL/TLS Handshake as described below.

Referring now to FIG. 3, a first exemplary embodiment of second network device 120 operating in accordance with an embodiment of the invention is shown. Second network device 120 comprises an input/output (I/O) interface 300, a data path (DP) processing element 310 and a control path processing element (320). As shown, each of these processing elements 310 and 320 is coupled to a dedicated memory 330 and 340, respectively. Alternatively, processing elements 310 and 320 may be processor cores implemented within the same processing unit (e.g., microprocessor, digital signal processor, etc.) or even coupled to shared memory 400 as shown in FIG. 4.

For both device architectures shown in FIGS. 3 and 4, DP processing element 310 is adapted to handle the above-identified Outer Authentication phase as represented by communication pathway 304 that includes receipt and processing of Client Hello message 150 (see FIG. 1) up to receipt and processing of Client Key Exchange message 180 (see FIG. 1). At this time, CP processing element 310 is not storing state information concerning the SSL/TLS Handshake. After successfully completing the Outer Authentication phase, normally after verification of receipt of Client Finish and Server Finish messages (not shown), information to continue the SSL/TLS Handshake is sent from DP processing element 310 to CP processing element 320 over communication pathway 305, which is now responsible for completing the SSL/TLS Handshake. Thereafter, CP processing element 320 controls the SSL/TLS Handshake as illustrated by communication pathway 306. At this time, DP processing element 310 does not receive the authentication message over communication pathway 304.

Figure 5:
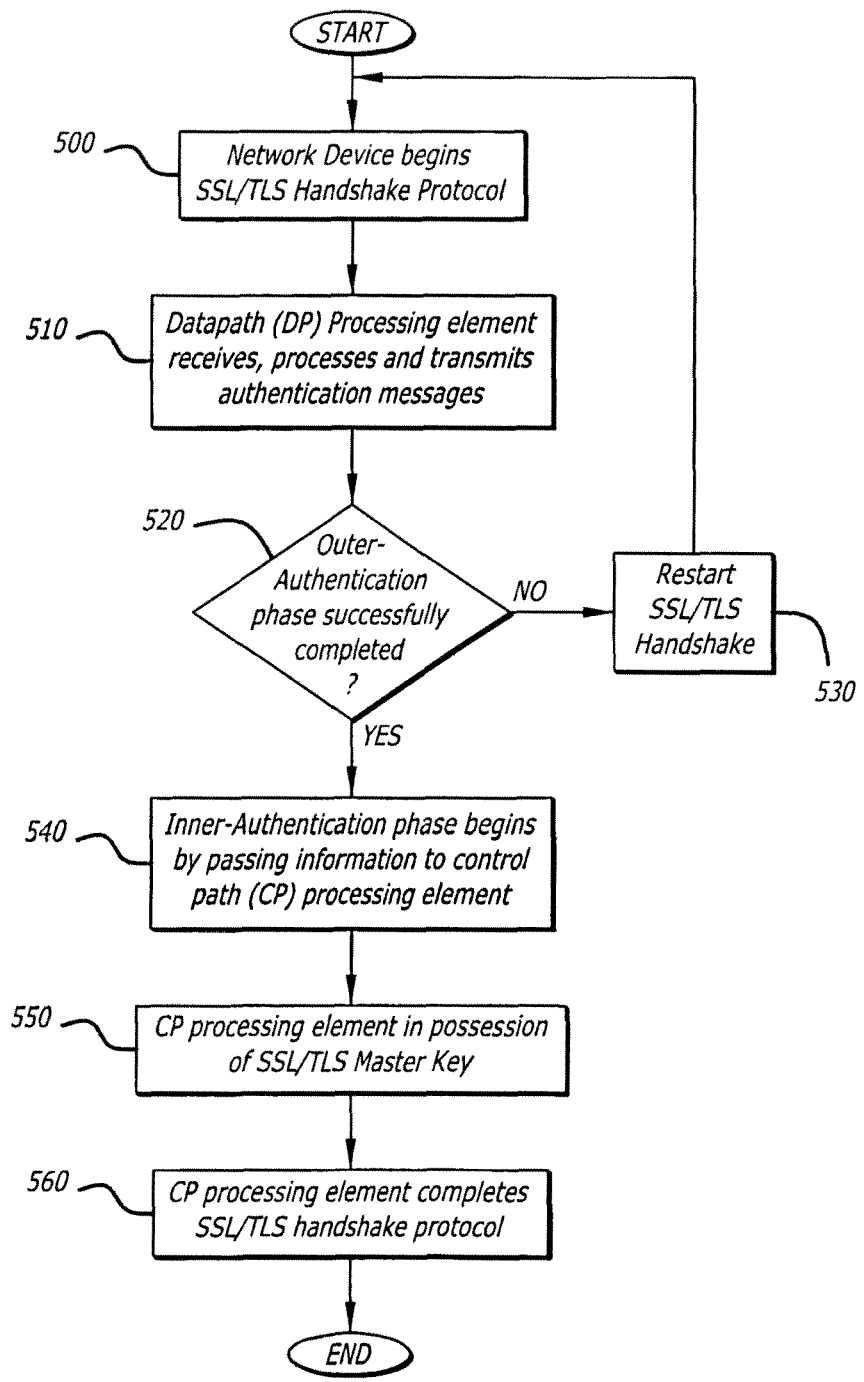
FIG. 5 is an exemplary flowchart of an embodiment of outer and inner authentication schemes of the SSL/TLS Handshake.

Referring to FIG. 5, an exemplary flowchart of an embodiment of the Outer and Inner authentication phases of the SSL/TLS Handshake is shown. Initially, a network device begins the SSL/TLS Handshake (block 500). At this time, a data path (DP) processing element is adapted to (i) receive and process incoming authentication messages for the network device and (ii) send outgoing authentication messages (block 510). Examples of incoming authentication messages include, but are not limited or restricted to the Client Hello message and the Client Key Exchange message. Similarly, examples of an outgoing authentication message includes, but is not limited or restricted to Server Hello and Server Hello Done messages.

Upon experiencing an error during transmission or processing of an authentication message, the SSL/TLS Handshake may be restarted (blocks 520 and 530). Otherwise, when the Outer Authentication phase has completed and the DP processing element is in receipt of information necessary to produce the Master key, such information is passed to a control path (CP) processing element located within the network device (blocks 520 and 540).

At this time, the Inner Authentication phase begins where the CP processing element comes into possession of the Master Key and is now responsible for completing the SSL/TLS Handshake without further involvement by the DP processing element (blocks 550 and 560).

Figure 6:
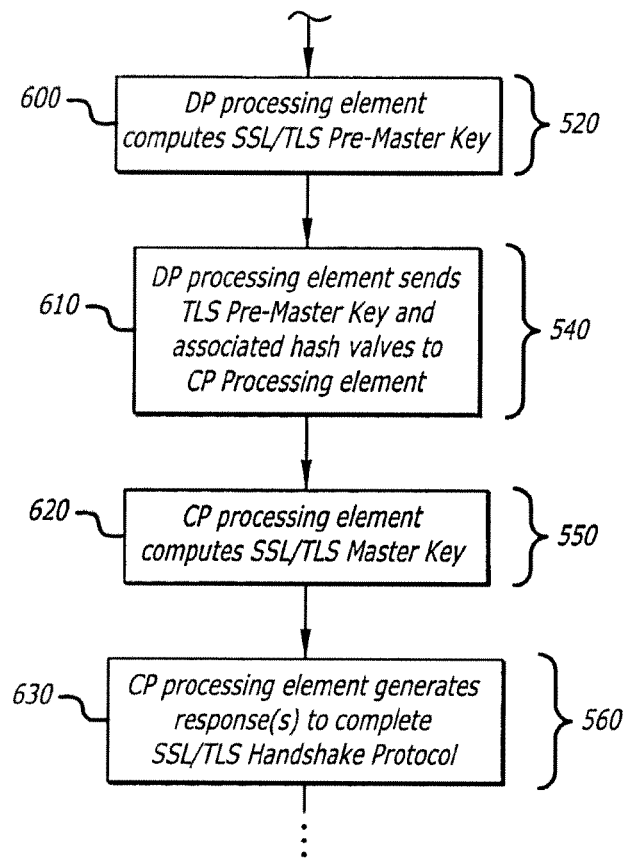
FIG. 6 is an exemplary flowchart of an embodiment of the handoff between the processing elements after completion of the outer-authentication scheme of the SSL/TLS Handshake of FIG. 5.

Referring now to FIG. 6, an exemplary flowchart of an embodiment of the handoff between the DP and CP processing elements after completion of the Outer Authentication phase of the SSL/TLS Handshake of FIG. 5 is shown. First, based on data (second random number) generated by the second network device as well as data provided by the first network device, namely the Pre-Master key within the Client Key Exchange message and the first random number within the Client Hello message, the second network device is capable of computing the SSL/TLS Pre-Master Key (see block 600). This computation can be used to determine that the Outer Authentication phase was successfully completed.

Thereafter, the DP processing element sends the Pre-Master key and perhaps one or more hash values for messages that have transpired during the SSL/TLS Handshake to the CP processing element (block 610). According to one embodiment of the invention, each hash value is a result produced by performing one-way hash operations on authentication messages during the SSL/TLS Handshake. These hash operations may be in accordance with MD5, SHA-1 or other hash algorithms that are performed in an iterative to produce a single hash value or in any other selected manner. The hash value is used by the CP processing element to continue the remaining portion of the SSL/TLS Handshake.

Upon receipt of the Pre-Master key, the CP processing element computes the Master Key based on the Pre-Master key, the first random number generated by the first network device and the second random number generated by the second network device (block 620). For instance, the Master Key may be generated by loading the Pre-Master key and the random numbers into a pseudo-random number generator (PRNG), where the result produced is equal to the Master Key.

After the Master Key is produced by the first network device, the CP processing element generates one or more responses to complete the SSL/TLS Handshake (block 630).

Figure 7:
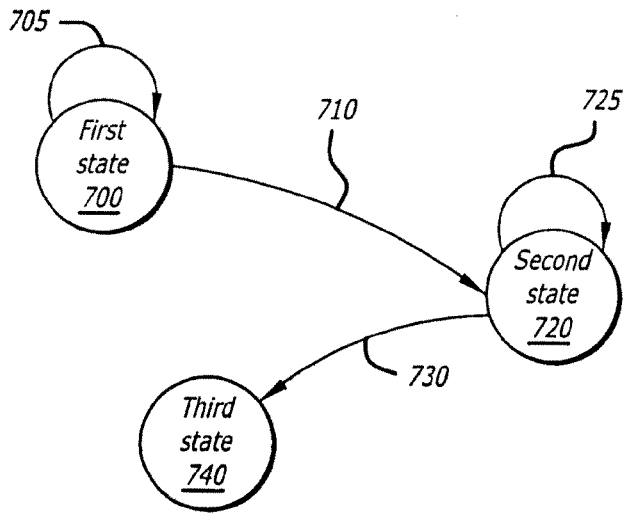
FIG. 7 is an exemplary state diagram of the operational duties of the processing elements within a networking switch to perform the SSL/TLS cryptographic protocols.

Referring now to FIG. 7, an exemplary state diagram of the operational duties of the processing elements within a networking switch to perform the SSL/TLS Handshake is shown. During the Outer Authentication phase of the SSL/TLS Handshake, the networking switch is placed in a first state 700 where the DP processing element controls the authentication message exchange 705. Upon completion of the Outer Authentication phase, as represented by state transition 710, the networking switch is placed in a second state 720 where authentication data is passed to the CP processing element. During the second state 720, the CP processing element of the networking switch controls the authentication message exchange in order to complete the SSL/TLS Handshake 725. Upon completion of the SSL/TLS Handshake, as represented by state transmission 730, the networking switch is placed in a third (steady) state 740 in which the functionality of the DP processing element and the CP processing element are not mutually exclusive.

While the invention has been described in terms of several embodiments, the invention should not limited to only those embodiments described, but can be practiced with modification and alteration within the spirit and scope of the appended claims. The description is thus to be regarded as illustrative instead of limiting.

What is claimed is:

1. A method comprising:
commencing, using a first processor within a first network device, a particular networking protocol;
transferring control of the particular networking protocol from the first processor to a second processor within the first network device;
completing the particular networking protocol using the second processor within the first network device.

2. The method of claim 1, wherein the networking protocol is an authentication procedure, wherein the first processor completes a first phase of the authentication procedure, and wherein the second processor completes a second phase of the authentication procedure.

3. The method of claim 1, wherein the particular networking protocol establishes a secure communication path between the first network device and a second device.

4. The method of claim 1, wherein the particular networking protocol comprises one or more of: a Secure Socket Layer (SSL) Handshake or a Transport Layer Security (TLS) Handshake.

5. The method of claim 4, wherein the control of the particular networking protocol is transferred in response to receiving a Client Key Exchange message.

6. The method of claim 4, wherein the control of the particular networking protocol is transferred subsequent to receiving and processing a client Key Exchange message.

7. The method of claim 1, wherein the first processor is a data path processor and the second processor is a control path processor.

8. A non-transitory computer readable storage medium comprising instructions which, when executed by at least by a first processor and a second processor in a first network device, are configured to perform operations comprising:
commencing, using the first processor within the first network device, a particular networking protocol;
transferring control of the particular networking protocol from the first processor to the second processor within the first network device;
completing the particular networking protocol using the second processor within the first network device.

9. The non-transitory computer readable storage medium of claim 8, wherein the networking protocol is an authentication procedure, wherein the first processor completes a first phase of the authentication procedure, and wherein the second processor completes a second phase of the authentication procedure.

10. The non-transitory computer readable storage medium of claim 8, wherein the particular networking protocol establishes a secure communication path between the first network device and a second device.

11. The non-transitory computer readable storage medium of claim 8, wherein the particular networking protocol comprises one or more of: a Secure Socket Layer (SSL) Handshake or a Transport Layer Security (TLS) Handshake.

12. The non-transitory computer readable storage medium of claim 11, wherein the control of the particular networking protocol is transferred in response to receiving a Client Key Exchange message.

13. The non-transitory computer readable storage medium of claim 11, wherein the control of the particular networking protocol is transferred subsequent to receiving and processing a client Key Exchange message.

14. The non-transitory computer readable storage medium of claim 8, wherein the first processor is a data path processor and the second processor is a control path processor.

15. A first network device comprising:
 a first processor;
 a second processor;
 the first network device being configured for:
  commencing, using the first processor, a particular networking protocol;
  transferring control of the particular networking protocol from the first processor to the second processor device;
  completing the particular networking protocol using the second processor within the first network device.

16. The first network device of claim 15, wherein the networking protocol is an authentication procedure, wherein the first processor completes a first phase of the authentication procedure, and wherein the second processor completes a second phase of the authentication procedure.

17. The first network device of claim 15, wherein the particular networking protocol establishes a secure communication path between the first network device and a second device.

18. The first network device of claim 15, wherein the particular networking protocol comprises one or more of: a Secure Socket Layer (SSL) Handshake or a Transport Layer Security (TLS) Handshake.

19. The first network device of claim 18, wherein the control of the particular networking protocol is transferred in response to receiving a Client Key Exchange message.

20. The first network device of claim 18, wherein the control of the particular networking protocol is transferred subsequent to receiving and processing a client Key Exchange message.

21. The first network device of claim 15, wherein the first processor is a data path processor and the second processor is a control path processor.

\* \* \* \* \*